United States Patent
Reynolds

(10) Patent No.: US 10,717,920 B1
(45) Date of Patent: Jul. 21, 2020

(54) VISCOSIFIED WATER INJECTION METHODS FOR ENHANCING HYDROCARBON RECOVERY FROM WELLS

(71) Applicant: Jay C. Reynolds, Vivian, LA (US)

(72) Inventor: Jay C. Reynolds, Vivian, LA (US)

(73) Assignee: Angel Petroleum Technologies LLC, Oil City, LA (US)

( * ) Notice: Subject to any disclaimer, the term of this patent is extended or adjusted under 35 U.S.C. 154(b) by 101 days.

(21) Appl. No.: 15/939,471

(22) Filed: Mar. 29, 2018

Related U.S. Application Data

(60) Provisional application No. 62/478,095, filed on Mar. 29, 2017.

(51) Int. Cl.
*E21B 49/08* (2006.01)
*C09K 8/588* (2006.01)
*E21B 43/16* (2006.01)

(52) U.S. Cl.
CPC .............. *C09K 8/588* (2013.01); *E21B 43/16* (2013.01); *E21B 49/08* (2013.01)

(58) Field of Classification Search
CPC .......... C09K 8/588; E21B 43/16; E21B 49/08
See application file for complete search history.

(56) References Cited

U.S. PATENT DOCUMENTS

| | | | |
|---|---|---|---|
| 3,305,016 A | 2/1967 | Lindblom et al. | |
| 3,523,581 A | 8/1970 | Murphy | |
| 3,724,545 A | 4/1973 | Knight | |
| 4,580,627 A | 4/1986 | Argabright et al. | |
| 4,687,586 A | 8/1987 | Argabright et al. | |
| 2009/0308609 A1* | 12/2009 | Curole | E21B 43/20 166/275 |
| 2014/0187451 A1 | 7/2014 | Tamsilian et al. | |
| 2017/0233639 A1* | 8/2017 | Hendou | B01D 65/02 166/267 |
| 2018/0016487 A1* | 1/2018 | Mateen | C09K 8/584 |

* cited by examiner

*Primary Examiner* — Silvana C Runyan
(74) *Attorney, Agent, or Firm* — R. Keith Harrison

(57) ABSTRACT

Enhanced methods of recovering hydrocarbons from a hydrocarbon reservoir having a production zone and a water zone underlying the production zone include measuring viscosities of formation water and hydrocarbon from the hydrocarbon reservoir, lowering a mobility ratio of the formation water with respect to the hydrocarbon by formulating a viscosifying polymer blend; forming viscosified water from the formation water in the hydrocarbon reservoir by injecting the viscosifying polymer blend into the water zone of the hydrocarbon reservoir; producing the viscosified water from the hydrocarbon reservoir; and producing the hydrocarbons from the hydrocarbon reservoir.

9 Claims, 6 Drawing Sheets

VISCOSIFIED WATER INJECTION METHODS FOR ENHANCING HYDROCARBON RECOVERY FROM WELLS

CROSS-REFERENCE TO RELATED APPLICATIONS

This application claims the benefit of U.S. provisional application No. 62/478,095, filed Mar. 29, 2017 and entitled "ENHANCED OIL RECOVERY METHOD", which provisional application is hereby incorporated by reference herein in its entirety.

FIELD

Illustrative embodiments of the disclosure generally relate to methods of mobilizing hydrocarbons for extraction from subterranean wells. More particularly, illustrative embodiments of the disclosure relate to enhanced hydrocarbon recovery methods which facilitate production of hydrocarbon from a hydrocarbon reservoir by beneficially altering the mobility ratio of formation water with respect to liquid hydrocarbon.

BACKGROUND

The background description provided herein is solely for the purpose of generally presenting the context of the illustrative embodiments of the disclosure. Aspects of the background description are neither expressly nor impliedly admitted as prior art against the claimed subject matter.

Polymers, both organic and inorganic, have been utilized for more than 30 years in different flooding strategies adapted to facilitate the horizontal movement of hydrocarbons from a wellbore where the polymer is injected towards other producing wells in the vicinity. These strategies seek to mobilize hydrocarbons horizontally from the point of injection employing a mixture of water and polymers to the productive region around a producing well. All the prevailing methodologies share the common drawback that nature favors the movement of hydrocarbons vertically rather than horizontally within any given hydrocarbon bearing porous medium.

Because of the natural heterogeneity found in all oil-bearing strata and the fact that an injected fluid will always find its path of least resistance from the point of injection to the point of extraction, all manner of conformance control issues arise when attempting to mobilize hydrocarbons horizontally in a traditional polymer flood. Even in a homogenous reservoir, the displacing polymer will channel through a more viscous oil in a process known as viscous fingering if the viscosity of the injecting polymer fluid is lower than that of the hydrocarbon being mobilized.

Conformance control measures may be implemented to mitigate the phenomenon that the displacing fluid such as a water or polymer/water mixture will not be displaced out radially in a piston-like fashion uniformly displacing the hydrocarbons but instead fingers through the hydrocarbon bearing strata leaving large volumes of oil which remain immobilized and immovable to the producing wellbores. In viscous fingering, the lower viscosity injectant fingers through the more viscous oil, allowing the injectant to reach the producing wellbore first, at which point the less-viscous injectant will be preferentially mobilized in lieu of a more viscous hydrocarbon to the producing wellbore, thus bypassing and leaving behind hydrocarbons which would otherwise be mobilized and produced.

Accordingly, enhanced hydrocarbon recovery methods which facilitate production of hydrocarbon from a hydrocarbon reservoir by beneficially altering the mobility ratio of formation water with respect to hydrocarbon may be desirable for some applications.

SUMMARY

Illustrative embodiments of the disclosure are generally directed to enhanced hydrocarbon recovery methods which facilitate production of hydrocarbon from a hydrocarbon reservoir by beneficially altering the mobility ratio of formation water with respect to hydrocarbons. An illustrative embodiment of the methods includes measuring viscosities of formation water and hydrocarbon from the hydrocarbon reservoir; lowering the mobility ratio of the formation water with respect to the hydrocarbon by formulating a viscosifying polymer blend; forming viscosified water from the formation water in the hydrocarbon reservoir by injecting the viscosifying polymer blend into the water zone of the hydrocarbon reservoir; producing the viscosified water from the hydrocarbon reservoir; and producing the hydrocarbons from the hydrocarbon reservoir. In some embodiments, the viscosified water may be recycled.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
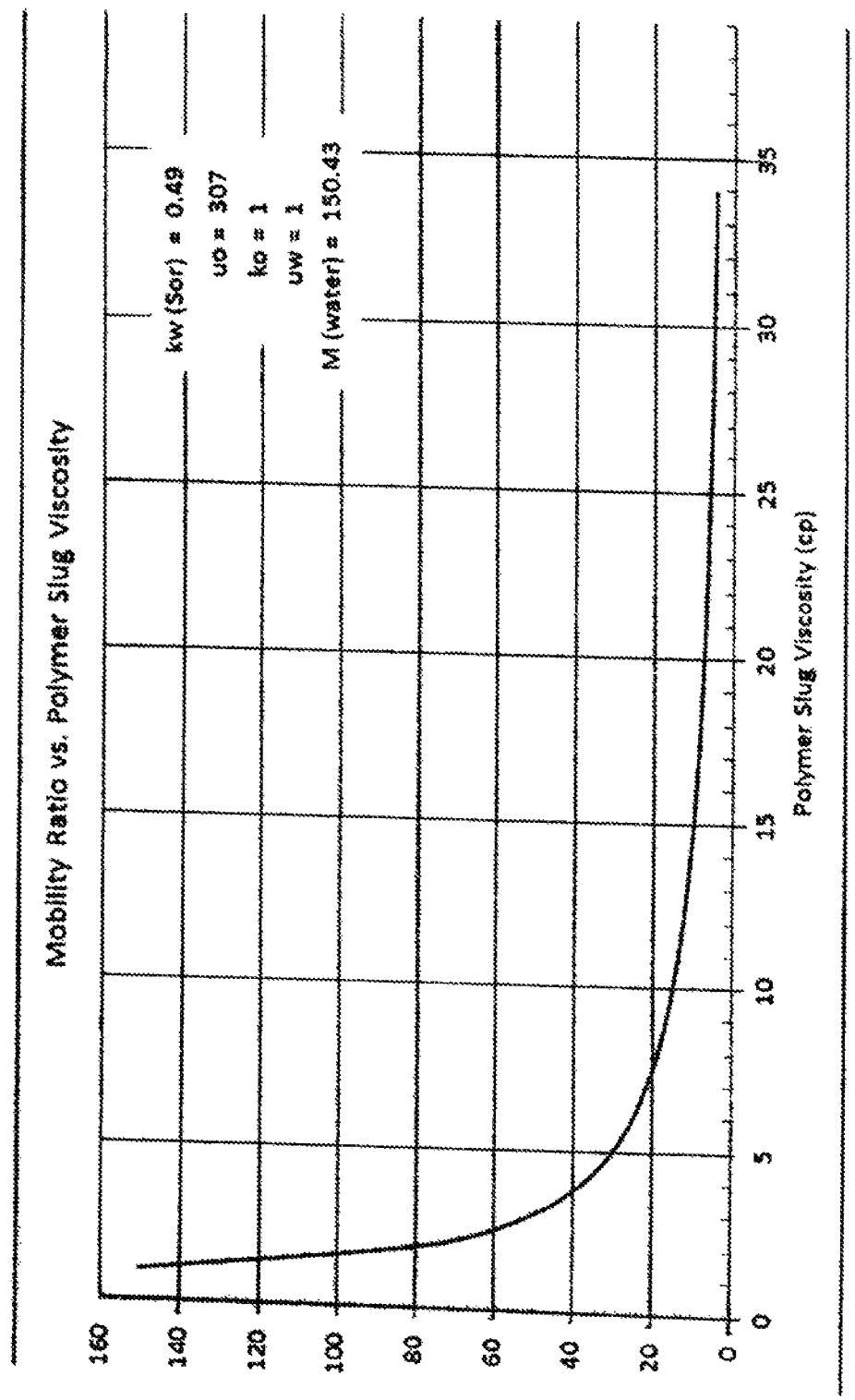
FIG. 1 is a graph on which is plotted mobility ratio vs. polymer viscosity in typical implementation of an illustrative embodiment of the enhanced hydrocarbon recovery methods.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Illustrative embodiments of the disclosure are generally directed to enhanced hydrocarbon recovery methods which facilitate production of hydrocarbon from a hydrocarbon reservoir by beneficially altering the mobility ratio of formation water with respect to hydrocarbon. The methods may alter the composition of formation water in a hydrocarbon reservoir to beneficially alter the mobility ratio of the formation water relative to hydrocarbons in the reservoir. Alteration of the mobility ratio such that the viscosity of the formation water approaches that of the hydrocarbons in the reservoir may prevent or eliminate undesirable "fingering" of the formation water through the hydrocarbon to the production well. As a result, the pumping fluid height in the production well may be lowered such that the production well can be "pumped down" to remove the hydrostatic load in the wellbore and allow native reservoir pressure to mobilize a greater percentage of hydrocarbons to the wellbore.

The methods may include measuring viscosities of reservoir water samples and crude oil and/or other hydrocarbon samples produced from a production well. A viscosifying polymer blend may be formulated based on the viscosities of the reservoir water samples and the hydrocarbon samples to achieve a selected mobility ratio of the formation water with respect to the hydrocarbon. The viscosifying polymer blend may be prepared by mixing at least one viscosifying polymer with water. In some embodiments, the viscosifying polymer blend may be prepared by mixing the at least one viscosifying polymer with the produced reservoir water. At least one viscosifying polymer may be added to the reservoir water in sufficient quantity and concentration to lower the mobility ratio of the reservoir water relative to the hydrocarbon in the viscosifying polymer blend. The viscosifying polymer blend may be introduced or injected through an injection well into the water zone which contains the formation water and underlies a hydrocarbon-containing production zone in the hydrocarbon reservoir. The injected or introduced viscosifying polymer blend may combine with the formation water to form polymer-viscosified water. The polymer-viscosified water may migrate from the water zone into the effective wellbore diameter to reduce the pumping fluid height in the production well. Accordingly, the natural reservoir pressure in the production zone may overcome the hydrostatic overburden in the production well, thereby mobilizing hydrocarbon to the production well and enhancing production of the hydrocarbon.

In some embodiments, the polymer-viscosified water may be produced from the production zone through the production well before the hydrocarbons are mobilized from the production zone to the production well. At least one viscosifying polymer may be added to the produced polymer-viscosified water to further enhance the viscosity of the polymer-viscosified water in order to reach or approach the desired mobility ratio of the formation water relative to the hydrocarbon in the hydrocarbon reservoir. The polymer-viscosified water to which the viscosifying polymer is added may be re-injected into the water zone through the injection well. This step may be repeated as many times as needed to achieve the selected mobility ratio of the polymer-viscosified water relative to the hydrocarbon in the production zone.

In some embodiments, the viscosifying polymer blend which is injected into the water zone of the hydrocarbon reservoir through the production well may include at least one liquid viscosifying polymer. The liquid viscosifying polymer blend may be injected into the water zone just beneath the hydrocarbon/water boundary between the hydrocarbon-containing production zone and the water zone. The methods may facilitate mobilization of hydrocarbons vertically, in line with the natural segregation of hydrocarbon and formation water in the hydrocarbon reservoir under the influence of gravity. Because the hydrocarbon may not be displaced horizontally, the problem of the hydrocarbon being swept from the vicinity of the injection well and displaced between nearby producing wells may be eliminated.

Reservoirs which are amenable to the enhanced hydrocarbon recovery methods of the disclosure typically do not evidence the expected degree of positive pressure rise when a standard or conventional polymer flood is used. Reservoirs which have considerable quantities of formation water in the water zone underlying the hydrocarbon-bearing production zone may not be good candidates for traditional flooding since, even though the water zone may be sealed with a polymer gel as a conformance-control measure before application of the polymer flood, the polymer flood may divert downwardly along the path of least resistance into the water zone as soon as the polymer flood reaches the periphery of the gel in the injection well. Significantly, the enhanced production of hydrocarbon is not accomplished by mechanical displacement of the hydrocarbon but by altering the effective permeability of the water-bearing sand in the hydrocarbon reservoir to the movement of produced formation water. By increasing the viscosity of the formation water, the effective permeability of the water-bearing sand in the reservoir is reduced, thereby eliminating or reducing "fingering" or movement of the formation water through the hydrocarbon to the production well. Consequently, the hydrocarbons may be mobilized through the production zone to the production well under natural reservoir pressure.

One of the challenges inherent in many hydrocarbon reservoirs, especially those which contain hydrocarbon at 20 API gravity and less, is that the differential viscosity between the hydrocarbons and the formation water in the reservoir may be so disparate as to yield an adverse mobility ratio in which the produced cut of water (Water/Oil Cut, or WOC) to hydrocarbon may be as low as 500:1 or lower. The enhanced hydrocarbon recovery methods of the disclosure may render the formation water which is resident in the hydrocarbon reservoir the friend rather than the enemy of the enhanced oil recovery methods.

Illustrative embodiments of the disclosure may utilize at least one associative polyacrylamide polymer to formulate the polymer blend which may be injected below the hydrocarbon/water boundary between the production zone and the water zone in the hydrocarbon reservoir. The methods of the disclosure may facilitate a non-hydrocarbon displacing flood of the water zone in the hydrocarbon reservoir to increase the viscosity and resistance to movement of the native formation water such that the hydrostatic overburden in the production well is reduced and the well may be pumped down to produce hydrocarbons from the well.

In the untreated condition of a production well in which no polymer blend is added to the formation water, once water breakthrough occurs at the wellbore, the level of pumping fluid in the well may rise to the point that the well cannot be pumped down sufficient to access the native reservoir pressure to most economically mobilize hydrocarbon to the wellbore irrespective of the capacity of the artificial lift system which is employed for the purpose. Without sufficient lowering of the hydrostatic overburden, there is insufficient pressure differential or mechanical energy between the wellbore and the reservoir to move the relatively much more viscous hydrocarbon through the strata of the production zone. The formation water, being so much less viscous than the hydrocarbon, may flow through the production zone with such greater relative ease that the water may overwhelm the capacity of the artificial lift system to pump the water from the wellbore. Efforts to utilize larger lift systems to create additional drawdown in the wellbore may be frustrated through two mechanisms:
1. Installation of a much larger pump may produce a temporary lowering of pumping fluid height, consequently producing more mechanical drawdown and improving the percentage of oil produced. The water channels in the formation may rapidly expand to supply the wellbore with the maximum quantity of water which the pump can handle, such that the improvement in the oil/water cut ratio is only temporary.
2. The perforations in the well casing of the production well, if inadequate in diameter and number, may serve to act as mechanical impediments or chokes to the delivery of fluid to the wellbore. This may present a mechanical obstruction to the quantity of fluid which the pump can move and may thus fail to result in a beneficial increase in the quantity of mechanical energy available to transport the hydrocarbons to the wellbore from the hydrocarbon-bearing production zone.

In typical implementation of the methods, an assessment of the differing relative viscosities of the hydrocarbon and formation water resident in the hydrocarbon reservoir may initially be made. Based on the resulting viscosity ratio, the mobility ratio can be determined and interpreted using a graph such as that illustrated in FIG. 1 of the drawings to afford a starting point in determining the least quantity of associative polymer necessary to provide the desired change in the mobility ratio.

As illustrated in FIG. 1, in some applications, the viscosity of the untreated formation water (to which no viscosifying polymer has been added) may average one centipoise, whereas the resident hydrocarbon may have a viscosity of about 300 centipoise, yielding a mobility ratio of 150.43. These conditions are analogous to those found in the Nacatoch B Reservoir in the Caddo Pine Island Field in northwest Louisiana. Raising the viscosity of the produced water to about 15 centipoise in the region of a production well may lower the adverse mobility ratio from about 150 to about 12, or approximately 90%.

For ordinary water flooding, a mobility ratio of as close to one as possible may be ideal to minimize the potential for viscous fingering. Viscous fingering may result when a less viscous fluid (in this case, the formation water) finds flow pathways of least resistance through a medium containing a more viscous fluid (in this case, hydrocarbon). Because of the wide disparity between the viscosity of untreated injection water and the resident hydrocarbon in the Natatoch, raising the viscosity of the water is necessary; otherwise, the injected water merely channels through and around the hydrocarbon, down into the water zone, and does not immobilize the hydrocarbon. Viscous fingering may particularly have a tendency to manifest along a pre-existing channel in the formation sand. The greater the difference between the viscosity of the injected fluid and the hydrocarbon, the earlier viscous fingering will manifest.

In some embodiments, a rotational viscometer, Marsh funnel test or other test may be used to determine the viscosities of the produced formation water, crude oil and/or other hydrocarbon, viscosifying polymer blend and polymer-viscosified water. A Marsh funnel is a well-known device which is used as a standardized measure of the viscosity of a liquid according to the time required for a known volume of liquid to flow from a cone through a short tube which extends from the cone. In use, the funnel is held vertically with the lower end of the tube closed. The liquid the viscosity of which is to be measured is poured through a mesh in the upper portion of the cone to remove from the liquid any particles which may otherwise block the tube as the liquid flows through the tube. When the rising liquid fills the closed tube and reaches the mesh in the cone, the volume of liquid inside the funnel is equal to the rated liquid volume. To take the measurement, the tube is opened as a stop-clock is started, and the liquid is allowed to run from the tube into an underlying measuring container. The time in seconds which elapses from the beginning to the end of the liquid draining from the funnel is recorded as a measure of the viscosity of the liquid. In other embodiments, alternative techniques known by those skilled in the art for determining the viscosity of liquids may be used to determine the viscosity of the produced formation water, crude oil and/or other hydrocarbon, viscosifying polymer blend and polymer-viscosified water.

According to the methods of the disclosure, a simple comparison of fluid viscosities using a Marsh Funnel in the field may provide sufficient initial benchmarking data. Marsh Funnel times may be taken for the produced crude hydrocarbon at reservoir temperature as well as for the formation water, polymer blend and polymer-viscosified water. The Marsh Funnel time for relatively fresh formation water may be approximately 26 seconds. Addition of the viscosifying polymer to the formation water to achieve a Marsh Funnel time of approximately 50 seconds may yield a viscosifying polymer blend having a viscosity of approximately 20 centipoise. Over time, with the continued reinjection of polymer-viscosified water, the produced water from the affected wells will rise toward the preferred injectant viscosity with a mobility ratio which reaches or approaches 1.

According to the methods of the disclosure, a viscosifying polymer blend may be injected into a dedicated injection well which is located in a geologically and geographically desirable location through perforations placed below the hydrocarbon/water boundary between the production zone and the water zone of the hydrocarbon reservoir. As the injected viscosifying polymer blend mixes with the formation water to produce viscosified water and the viscosified water subsequently migrates to the adjacent production wells, the volume of formation water which is produced from the production wells will drop due to the presence of the viscosified water and the conference of a Residual Resistance Factor to water movement through the hydrocarbon-bearing production zone. If the water channels through the hydrocarbon reservoir are sufficiently well-developed, then injection through the perforations in the well casing of the production well will still preferentially route to the hydrocarbon/water boundary.

In some embodiments, the formation water which is produced through the production wells may be slated for reinjection through the injection well. The produced formation water may be monitored for polymer concentration. Viscosifying polymer may be added to the formation water through the recovery process to maintain the desired viscosity until the polymer concentration in the produced formation water matches the concentration design strength for the project and mobility ratio improvement has spread outward to the number of production wells to be affected. The reinjected formation water may continue to spread to adjacent production wells as long as the quantity of polymer-viscosified water exceeds the quantity of water produced through the affected production wells.

In some embodiments, the methods may utilize water-soluble, carboxylate-containing, cross-linkable acrylamide polymers as the viscosifying polymer. As used herein, an acrylamide polymer is defined as a polymer having one or more acrylamide groups. Acrylamide polymers may include homopolymers, copolymers, terpolymers and tetrapolymers of acrylamide. Acrylamide polymers specifically include polyacrylamide (PA), partially hydrolyzed polyacrylamide (PHPA), copolymers of acrylamide and acrylate (ACP) and other copolymers, terpolymers and tetrapolymers of acrylamide.

Figure 2:
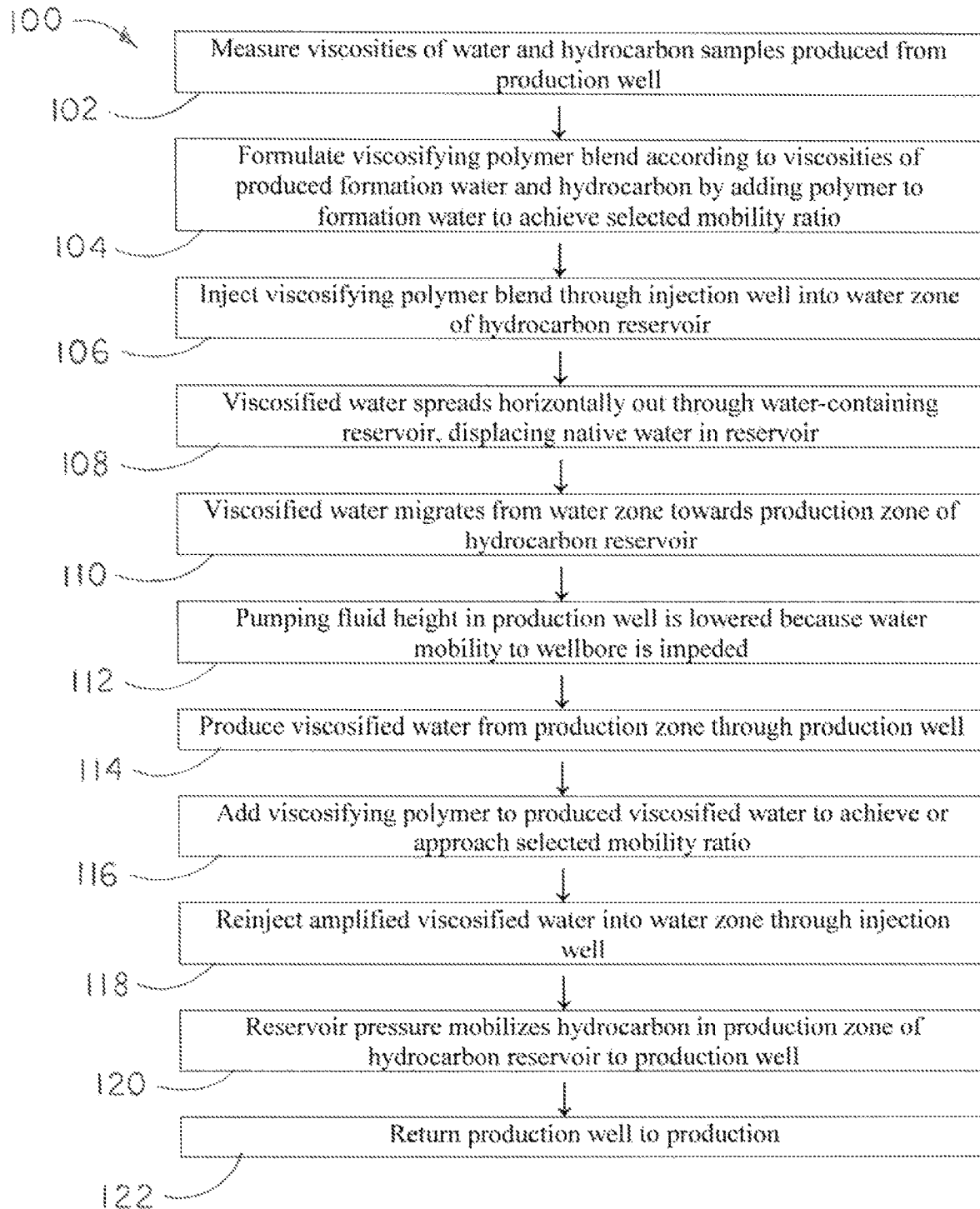
FIG. 2 is a flow diagram of an illustrative embodiment of the enhanced hydrocarbon recovery methods.
Figure 3:
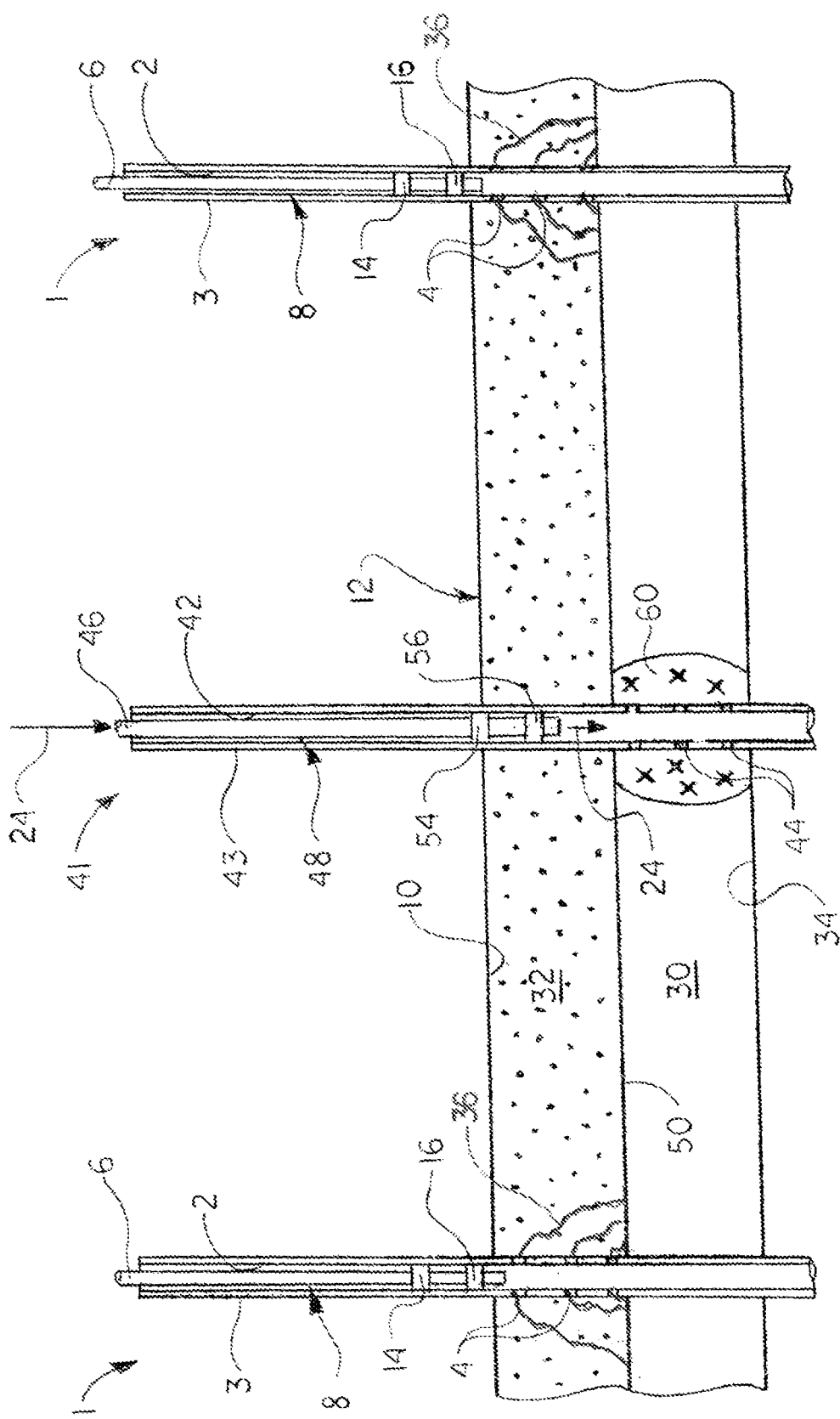
FIGS. 3-6 are sectional views, respectively, of a hydrocarbon reservoir and an injection well and a pair of production wells installed in the hydrocarbon reservoir, more particularly illustrating typical implementation of an illustrative embodiment of the enhanced hydrocarbon recovery methods.

Referring to FIGS. 2-6 of the drawings, a flow diagram 100 of an illustrative embodiment of the enhanced hydrocarbon recovery methods is illustrated in FIG. 2. A pair of subterranean hydrocarbon production wells 1 and a subterranean injection well 41 in typical implementation of the enhanced hydrocarbon recovery methods are illustrated in FIGS. 3-6. The hydrocarbon production wells 1 and the injection well 41 may be installed in a subterranean hydrocarbon formation or reservoir 12. The hydrocarbon reservoir 12 may include a production zone 10 which contains oil and/or other hydrocarbons 32. A water zone 34 which contains formation water 30 may underlie the production zone 10. A hydrocarbon/water boundary 50 may separate the production zone 10 from the underlying water zone 34.

The hydrocarbon producing wells 1 may facilitate production of hydrocarbon 32 from the production zone 10 within the hydrocarbon reservoir 12. The hydrocarbon reservoir 12 may have substantially zero liquid permeability contrast. Each production well 1 may have a wellbore 2 which extends into the ground through the production zone 10. A well casing 2 may line the wellbore 3. Perforations 4 may be provided in the well casing 2 at the production zone 10. Production tubing 6 may extend into the well casing 2 typically through a tension packer 14 and/or a cup packer 16. An annulus 8 may be formed between the outer diameter (OD) of the production tubing 6 and the inner diameter (ID) of the well casing 2. As illustrated in FIGS. 3-6, in implementation of the methods of the disclosure, which will be hereinafter described, water channels 36 may extend from the water zone 34 through the production zone 10 to the perforations 4 in the well casing 2 of the production well 1.

The injection well 41 may facilitate initial injection of a viscosifying polymer blend 24 into the water zone 34 within the hydrocarbon reservoir 12. The injection well 41 may have a wellbore 43 which extends into the ground through the production zone 10 and the underlying water zone 34. A well casing 42 may line the wellbore 43. Perforations 44 may be provided in the well casing 42 at the water zone 34. Injection tubing 46 may extend into the well casing 42 typically through a tension packer 54 and/or a cup packer 56. An annulus 48 may be formed between the outer diameter (OD) of the production tubing 46 and the inner diameter (ID) of the well casing 42.

As illustrated in FIG. 2, at Step 102 of the method 100, viscosities of samples of formation water 30 and crude oil and/or other hydrocarbon 32 which are produced from the production zone 10 (FIGS. 3-6) of the hydrocarbon reservoir 12 may be measured. In some embodiments, the viscosities of the formation water 30 and hydrocarbon 32 may be measured using a Marsh funnel test, as was heretofore described. In other embodiments, alternative methods and techniques may be used to measure the viscosities of the formation water 30 and hydrocarbon 32. The viscosity of the hydrocarbon 32 at reservoir temperature may be measured.

At Step 104 of FIG. 2, a viscosifying polymer blend 24 (FIG. 3) may be formulated according to the viscosities of the produced samples of formation water 30 and hydrocarbon 32 which were measured at Step 102 to achieve a selected mobility ratio of the formation water 30 relative to the hydrocarbon 32. In some embodiments, the viscosifying polymer blend 24 may include at least one liquid viscosifying polymer. In formulation of the viscosifying polymer blend 24, a sufficient quantity and concentration of the viscosifying polymer may be added to the formation water 30 to raise the viscosity of the formation water 30 from typically about 1 centipoise to about 15 centipoise. In some applications, the hydrocarbon 32 which is resident in the production zone 10 of the hydrocarbon reservoir 12 may have a viscosity of about 300 centipoise, whereas the formation water 30 in the water zone 34 may have a viscosity of about 1 centipoise. Thus, raising the viscosity of the formation water 30 to about 15 centipoise in the viscosifying polymer blend 24 may lower the mobility ratio of the formation water 30 relative to the hydrocarbon 32 from about 150 to about 12, or approximately 90%.

In some embodiments, the viscosifying polymer blend 24 may include a polymer blend or mixture of multiple polymers. Non-limiting examples of viscosifying polymers which are suitable for formulating the viscosifying polymer blend 24 include water-soluble, carboxylate-containing, cross-linkable acrylamide polymers. The acrylamide polymers may include one or more acrylamide groups. Acrylamide polymers may include homopolymers, copolymers, terpolymers and tetrapolymers of acrylamide. Acrylamide polymers specifically include polyacrylamide (PA), partially hydrolyzed polyacrylamide (PHPA), copolymers of acrylamide and acrylate (ACP) and other copolymers, terpolymers and tetrapolymers of acrylamide.

Figure 4:
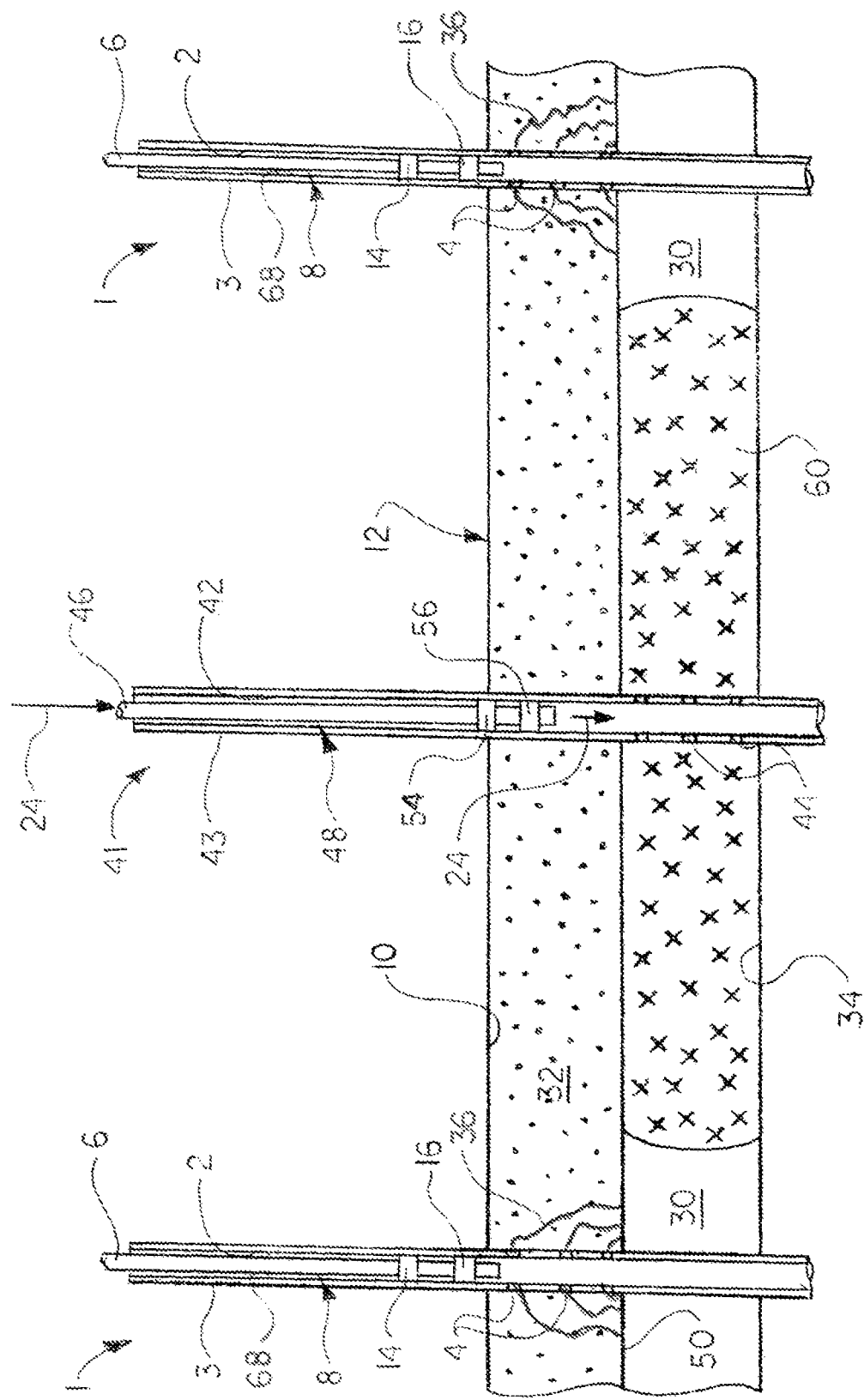
Figure 5:
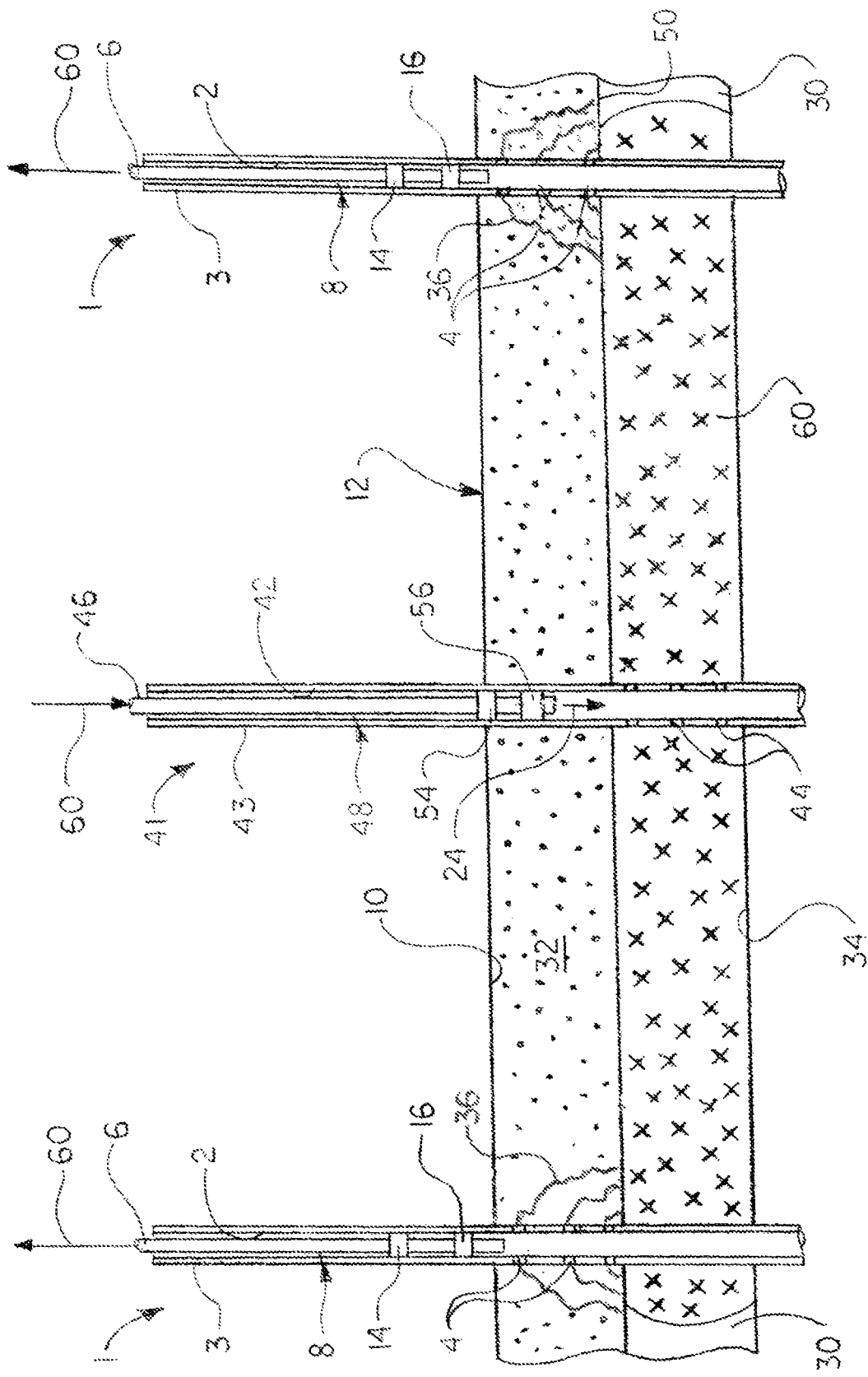

At Step 106 of FIG. 2, the viscosifying polymer blend 24 (FIG. 3) may be injected through the injection tubing 46 and the perforations 44, respectively, in the well casing 42 of the injection well 41 and into the water zone 34. In the water zone 34, the viscosifying polymer blend 24 may mix with the formation water 30, forming polymer-viscosified water 60. At Step 108, the polymer-viscosified water 60 may spread horizontally outwardly through the water zone 34 of the hydrocarbon reservoir 12, as illustrated in FIG. 4. At Step 110, the polymer-viscosified water 60 may migrate from the water zone 34 into the production zone 10 of the hydrocarbon reservoir 12 at each production well 1, as illustrated in FIG. 5. In some applications, water channels 36 may exist in the production zone 10. Accordingly, the polymer-viscosified water 60 may preferentially route through the water channels 36 to the perforations 4 in the well casing 3 of the production well 1. The polymer-viscosified water 60 may enter and prevent or impede influx of the formation water 30 into the wellbore 2 of the production well 1. Consequently, at Step 112 of FIG. 2, the height of the pumping fluid in the wellbore 2 of the production well 1 may be lowered, such as from the original pumping fluid level 68 illustrated in FIG. 4 to the lowered pumping fluid level 70 illustrated in FIG. 6.

At Step 114, viscosified water 60 may be produced from the production zone 10 through the production well 1, as illustrated in FIG. 5. At Step 116, additional viscosifying polymer blend 24 may be added to the produced viscosified water 60 to achieve or approach the selected mobility ratio of the viscosified water 60 relative to the hydrocarbon 32. At Step 118, the amplified viscosified water 60 may be reinjected into the water zone 34 through the injection well 41. In some embodiments, Steps 114, 116 and 118 may be repeated as many times as needed to achieve the selected mobility ratio of the polymer-viscosified water 60 relative to the hydrocarbon in the production zone.

Figure 6:
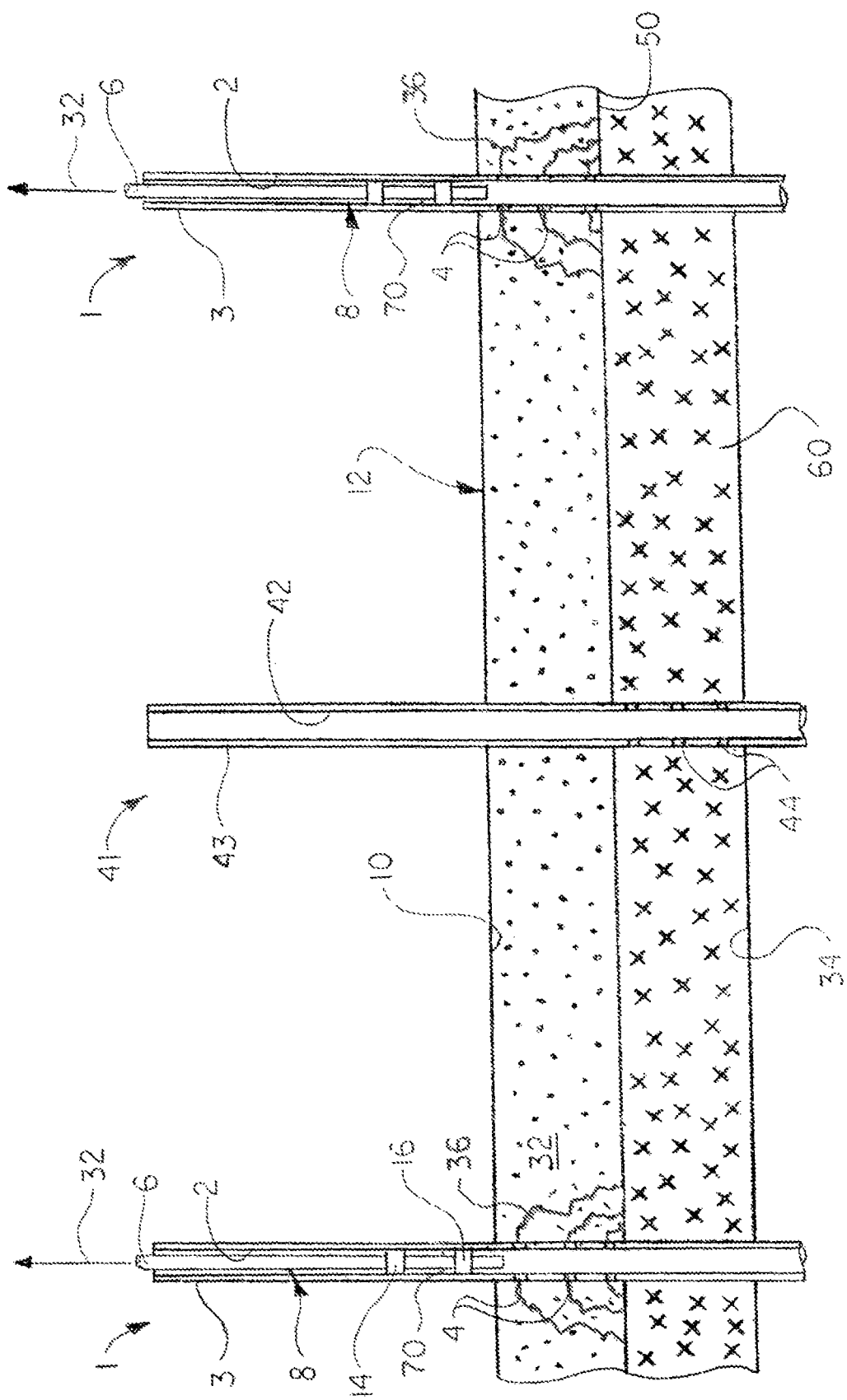

At Step 120, reservoir pressure may mobilize hydrocarbon 32 in the production zone 10 of the hydrocarbon reservoir 12 to the production well 1. At Step 122, the production well 1 may be returned to production in which hydrocarbon 32 is produced from the production zone 10 through the perforations 4 in the well casing 3 and the production string 6, respectively, as illustrated in FIG. 6, due to the resultant drop in pumping fluid levels.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A method of enhancing recovery of hydrocarbons from a hydrocarbon reservoir through a subterranean wellbore and a production well communicating with the wellbore, the hydrocarbon reservoir having a production zone, a water zone underlying the production zone and an injection well communicating with the water zone, comprising:
   measuring viscosities of formation water and hydrocarbon from the hydrocarbon reservoir;
   formulating a viscosifying polymer blend to achieve a selected lowered mobility ratio of the formation water with respect to the hydrocarbon, the selected lowered mobility ratio less than about 150;
   forming viscosified water from the formation water in the hydrocarbon reservoir by Injecting the viscosifying polymer blend directly into the water zone of the hydrocarbon reservoir through the inject ion well, whereby height of the formation water in the production well is lowered;
   producing the viscosified water from the hydrocarbon reservoir by pumping down the production well to remove the formation water from the wellbore and allow reservoir pressure to mobilize the hydrocarbons to the wellbore;
   forming amplified viscosified water by adding at least one viscosifying polymer to the viscosified water to achieve the selected lowered mobility ratio;
   reinjecting the amplified viscosified water into the water zone of the hydrocarbon reservoir; and
   producing the hydrocarbons from the hydrocarbon reservoir by allowing the reservoir pressure to mobilize the hydrocarbons to the wellbore.

2. The method of claim 1 wherein formulating the viscosifying polymer blend comprises mixing the at least one viscosifying polymer with water.

3. The method of claim 2 wherein mixing the at least one viscosifying polymer with water comprises mixing at least one polyacrylamide polymer with water.

4. The method of claim 3 wherein mixing at least one polyacrylamide polymer with water comprises mixing at least one liquid polyacrylamide polymer including water-soluble, carboxylate-containing, cross-linkable acrylamide polymers selected from the group consisting of polyacrylamide (PA), partially hydrolyzed polyacrylamide (PHPA), copolymers of acrylamide and acrylate (ACP) and copolymers, terpolymers and tetrapolymers of acrylamide with water.

5. The method of claim 1 wherein injecting the viscosifying polymer blend into the water zone of the hydrocarbon reservoir comprises injecting the viscosifying polymer blend into the water zone of the hydrocarbon reservoir through an injection tubing.

6. The method of claim 1 wherein producing the viscosified water from the hydrocarbon reservoir comprises producing the viscosified water from the hydrocarbon reservoir through a production tubing.

7. A method of enhancing recovery of hydrocarbons from a hydrocarbon reservoir through a subterranean wellbore and a production well communicating with the wellbore, the hydrocarbon reservoir having a production zone, a water zone underlying the production zone and an injection well communicating with the water zone, comprising:
   measuring viscosities of formation water and hydrocarbon from the water zone and the production zone, respectively, of the hydrocarbon reservoir;
   formulating a viscosifying polymer blend to achieve a selected lowered mobility ratio of the formation water with respect to the hydrocarbon by mixing at least one viscosifying polymer with water, the selected lowered mobility ratio in the range of from about 150 to about 12;
   forming viscosified water from the formation water in the hydrocarbon reservoir by injecting the viscosifying polymer blend directly into the water zone of the hydrocarbon reservoir through an injection tubing in the injection well, whereby height of the formation water in the production well is lowered;
   producing the viscosified water from the hydrocarbon reservoir through a production tubing in the production well by pumping down the production well to remove the formation water from the wellbore and allow reservoir pressure to mobilize the hydrocarbons to the wellbore;
   forming amplified viscosified water to achieve the selected lowered mobility ratio by adding a viscosifying polymer to the viscosified water;
   reinjecting the amplified viscosified water into the water zone of the hydrocarbon reservoir through the injection tubing; and
   producing the hydrocarbons from the hydrocarbon reservoir through the production tubing by allowing the reservoir pressure to mobilize the hydrocarbons to the wellbore.

8. The method of claim 7 wherein mixing at least one viscosifying polymer with water comprises mixing at least one polyacrylamide polymer with water.

9. The method of claim 8 wherein mixing at least one polyacrylamide polymer with water comprises mixing at least one liquid polyacrylamide polymer including water-soluble, carboxylate-containing, cross-linkable acrylamide polymers selected from the group consisting of polyacrylamide (PA), partially hydrolyzed polyacrylamide (PHPA), copolymers of acrylamide and acrylate (ACP) and copolymers, terpolymers and tetrapolymers of acrylamide with water.

* * * * *